(12) United States Patent
Pickard et al.

(10) Patent No.: US 12,092,922 B2
(45) Date of Patent: *Sep. 17, 2024

(54) BACKLIT DISPLAY

(71) Applicant: Korrus, Inc., Los Angeles, CA (US)

(72) Inventors: Paul Kenneth Pickard, Los Angeles, CA (US); Sina Afshari, Los Angeles, CA (US); Raghuram L. V. Petluri, Los Angeles, CA (US); Benjamin Harrison, Los Angeles, CA (US)

(73) Assignee: KORRUS, INC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,391

(22) Filed: Mar. 29, 2022

(65) Prior Publication Data

US 2022/0404667 A1 Dec. 22, 2022

Related U.S. Application Data

(63) Continuation of application No. 17/363,145, filed on Jun. 30, 2021, now Pat. No. 11,287,692.

(60) Provisional application No. 63/171,142, filed on Apr. 6, 2021.

(51) Int. Cl.
*G02F 1/13357* (2006.01)
*G02F 1/1335* (2006.01)

(52) U.S. Cl.
CPC .. *G02F 1/133603* (2013.01); *G02F 1/133514* (2013.01); *G02F 1/133614* (2021.01); *G02F 1/133617* (2013.01); *G02F 1/133624* (2021.01); *G02F 1/133626* (2021.01); *G02F 1/133533* (2013.01)

(58) Field of Classification Search
CPC ......... G02F 1/133603; G02F 1/133514; G02F 1/133614; G02F 1/133617; G02F 1/133624; G02F 1/133626; G02F 1/133533
See application file for complete search history.

(56) References Cited

U.S. PATENT DOCUMENTS

| | | | |
|---|---|---|---|
| 10,609,798 B1 ‡ | 3/2020 | Maa | H05B 45/20 |
| 11,287,692 B1 * | 3/2022 | Pickard | G02F 1/133514 |
| 2019/0041699 A1 ‡ | 2/2019 | David | G02F 1/133617 |

OTHER PUBLICATIONS

International Search Report mailed May 5, 2022, in International Application No. PCT/US2022/023689.
Written Opinion of the International Searching Authority mailed May 5, 2022, in International Application No. PCT/US2022/023689.

* cited by examiner
‡ imported from a related application

*Primary Examiner* — Anne M Hines
*Assistant Examiner* — Jose M Diaz
(74) *Attorney, Agent, or Firm* — FisherBroyles LLP

(57) ABSTRACT

A backlit display for emitting a display light, said display comprising a backlight configured to emit a high circadian stimulation backlight spectrum having a spectral power distribution (SPD) with an overall power, and a blue range from 440-490 nm with a blue SPD power of at least 25% of said overall power, a pixel array comprising at least three filters, said at least three filter comprising at least a first filter, a second filter, and third filter, forming at least three subpixels, wherein said backlight is configured to backlight said pixel array, and wherein said display light has a gamut having an sRGB coverage of at least 85%.

19 Claims, 7 Drawing Sheets

BACKLIT DISPLAY

REFERENCE TO RELATED APPLICATION

This application is based on U.S. Provisional Application No. 63/171,142, filed Apr. 6, 2021, which is hereby incorporated by reference in its entirety.

FIELD OF INVENTION

The present invention relates, generally, to a backlit computer display, and, more specifically, to a computer display having controllable spectrum to control/moderate the display's circadian effects on a user.

BACKGROUND

Computer displays are ubiquitous in today's society, but, recently, studies have shown that they may have adverse health effects. In particular, blue light from the display tends to have a wavelength that is thought to interrupt a person's circadian rhythm by suppressing melatonin production, which affects a person's sleep. While high circadian effective energy may be helpful during the person's daytime hours, exposure to this light in the evening may negatively impact the person's sleep schedule, thus ultimately diminishing the person's health and wellbeing.

Today, most displays are liquid crystal displays (LCDs). By way of background, a conventional LCD display comprises a backlight for providing light to individual pixels arranged in a rectangular grid. Each of the pixels of the display includes a plurality of subpixel color filters (e.g., red, green, and blue). Liquid crystals are digitally controlled to change their transmissivity incrementally (e.g., 254 increments) between opaque and transparent, and thereby control the transmission of the backlight through the subpixels. As used herein, the term "display" broadly includes any surface for displaying digital content, including, for example, a computer display, a television, a phone display, a virtual reality display, and an augmented reality display, among others.

A conventional backlight of an LCD typically comprises a blue LED pumping a phosphor to emit white light. Although the emitted light appears white, a large portion of the light's radiometric power is in the blue spectrum—i.e., between 440-490 nm. For example, a conventional backlit LCD computer display, using a blue-LED with phosphor, may have a blue radiometric power between 440 nm and 490 nm of about 24% or so. Such a significant percentage of blue radiometric power tends to stimulate a person's circadian response.

One measure of a spectrum's circadian stimulation effect is its, melanopic lux or its melanopic ratio. (Melanopic ratio is the melanopic lux divided by the photopic lux.) These measures are well known and are calculated by multiplying the spectrum by either the melanopic or photopic spectrum and then integrating across all wavelengths. In terms of sleep and wake thresholds, a melanopic lux (m-lux) greater than 300 m-lux for day time is preferred for a wake threshold, and less than 1.5 m-lux for night time is preferred for a sleep threshold.

While current efforts are focused on controlling monitors to moderate circadian effects, Applicant recognizes that such control cannot come at the expense of light quality. More specifically, regardless of the circadian stimulation of the display, the gamut of the display should be good.

As used herein, the term "gamut" refers to a portion of the color space in the CIE 1931 chromaticity diagram that can be reproduced. There are number of different standards for evaluating gamut. For example, sRGB defines the chromaticities of the red, green, and blue primaries, the colors where one of the three channels is nonzero and the other two are zero. sRGB is a standard RGB (red, green, blue) color space that HP and Microsoft created cooperatively in 1996 to use on monitors, printers, and the Web. It was subsequently standardized by the IEC as IEC 61966-2-1:1999. Another example of a color gamut standard is DCIP3, which is a common RGB color space for digital movie projection from the American film industry. Yet another standard is Rec2020 which defines various aspects of ultra-high-definition television (UHDTV) with standard dynamic range (SDR) and wide color gamut (WCG). (It should be understood that those of skill in the art, in light of this disclosure, will be able to apply the appropriate gamut standard for the particular application/need.)

Throughout this disclosure, the quality of the display gamut is quantified in terms of its coverage of a standard gamut. For example, a display gamut which covers 85% or so of the sRGB gamut would be considered good, and, obviously, as the percentage goes up, the quality of the gamut goes up. Likewise, as a percentage goes down, the quality of the gamut goes down. For example, returning to the example above, the conventional backlight, using a blue-LED with phosphor, has the following gamut coverages: sRGB Coverage: 92.5%; DCIP3 Coverage: 82.1%; and Rec2020 Coverage: 62.8%

Still another parameter to be considered in display light is the transmission of light from 445-460 nm (herein referred to as "short blue light"). Short blue light may be harmful to human eyes in sufficient quantities. Accordingly, there is currently an effort to reduce the emission of short blue light in display screens. However, reducing this light has unintended consequences, including, for example, diminishing the circadian stimulation of the light, and diminishing the quality of light in general.

Indeed, the various display emission considerations discussed above—i.e. high/low circadian stimulation, gamut, and reduction of short blue light—tend to be at odds with one another, in which optimizing one consideration diminishes the others, such that no single system can provide display light which optimizes all the considerations.

Accordingly, Applicant has identified the need for a backlight display system which controls/moderates circadian stimulation, optimizes gamut, while minimizing harmful light. The present invention fills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In the present disclosure, the circadian stimulation of emitted light from a display screen is controlled by varying the spectrum of the backlight. More specifically, Applicant discloses a backlight system having two or more modes. In a first mode, the backlight emits a high circadian stimulation backlight emission in which a relatively large portion of the emission's power is in the range of 440-490 nm, and, in a second mode, the backlight emits a low circadian stimulation backlight emission in which a relatively large portion of the emission's power is the range of 380-430 nm. In an optional third mode, the backlight emits a combined emission from the first and second modes.

Although the different backlight modes are effective in moderating circadian stimulation, Applicant has discovered that conventional, sub-pixel filters used in LCD backlit displays are not as selective as they need to be to emit display light having a good gamut. More specifically, Applicant discovered that conventional filters have significant overlapping transmissions between the blue and green filters. This overlap results in too much long blue or cyan being transmitted through the green filter when using a high circadian stimulation backlight. Additionally, the conventional blue filter is centered around 450 nm, and cuts off about 20-40% of long blue and about 15% or so of violet. The emission of long blue in the green filter and the suppression of long blue in the blue filter, reduces the quality of the gamut. Applicant also discovered that the conventional red filter transmits an undesirable amount of violet when using a low circadian stimulation backlight. Accordingly, Applicant has configured blue, green, and red filters to align with both the high and low circadian stimulation backlights to emit display light having an excellent gamut. Moreover, in the optional third mode, the high and low circadian stimulation backlights are combined to emit a combined light along a continuum between high and low circadian stimulation in which the filters function to maintain a substantially invariant correlated color temperature (CCT) between the high circadian stimulation mode and the low circadian stimulation mode.

In one embodiment, the present invention relates to a backlit display for emitting a display light, the display comprising: (a) a backlight configured to emit a high circadian stimulation backlight spectrum having a spectral power distribution (SPD) with an overall power, and a blue range from 440-490 nm with a blue SPD power of at least 25% of the overall power; (b) a pixel array comprising at least three filters, the at least three filter comprising at least a first filter, a second filter, and third filter, forming at least three sub-pixels, wherein the backlight is configured to backlight the pixel array, and (c) wherein the display light has a gamut having an sRGB coverage of at least 85%.

In another embodiment, the present invention relates to a backlit display for emitting a display light, the display comprising: (a) a backlight configured to emit a low circadian stimulation backlight spectrum having a spectral power distribution (SPD) with an overall power, and a violet range from 380-430 nm with a violet SPD power of at least 20% of the overall power; (b) a pixel array comprising at least three filters, the at least three filter comprising at least a first filter, a second filter, and third filter, forming at least three sub-pixels, wherein the backlight is configured to backlight the pixel array, and (c) wherein the display light has a gamut having an sRGB coverage of at least 85%.

In yet another embodiment, the present invention relates to a backlit display for emitting variable display light, the backlit display comprising: (a) a backlight configured to emit at least a high circadian stimulation backlight in a first mode, a low circadian stimulation backlight spectrum in second mode, the high circadian stimulation backlight spectrum having a first SPD with a first overall power, and having a blue range from 440-490 nm with a blue SPD power of at least 25% of the first overall power; the low circadian stimulation backlight spectrum having a second SPD with a second overall power, and a violet range of 380-430 nm with a violet SPD power of at least 20% of the second overall power; (b) a pixel array comprising at least three filters, the at least three filter comprising at least a first filter, a second filter, and third filter, forming at least three sub-pixels, wherein the backlight is configured to backlight the pixel array, and (c) wherein the display light has a gamut having an sRGB coverage of at least 85% in either the first mode or the second mode.

In another embodiment, the present invention relates to a backlight for a backlit display for emitting variable display light, the backlight comprising: (a) a plurality of LED channels configured to emit circadian stimulation backlight in a plurality of modes, a first mode in which a high circadian stimulation backlight spectrum is emitted, a second mode in which a low circadian stimulation backlight spectrum is emitted, and a third mode in which a combined backlight spectrum of the low circadian stimulation backlight spectrum and the high circadian stimulation backlight spectrum is emitted, the high circadian stimulation backlight spectrum having a first SPD with a first overall power, and having a blue range from 440-490 nm with a blue SPD power of at least 25% of the first overall power, the low circadian stimulation backlight spectrum having a second SPD with a second overall power, and a violet range of 380-430 nm with a violet SPD power of at least 20% of the second overall power, and the combined backlight spectrum having a third SPD with a third overall power, and a short blue range of 445-460 nm with a short blue SPD power no greater than 10% of the third overall power; (b) circuitry for driving the plurality of channels independently.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Backlight Spectrum

Figure 1:
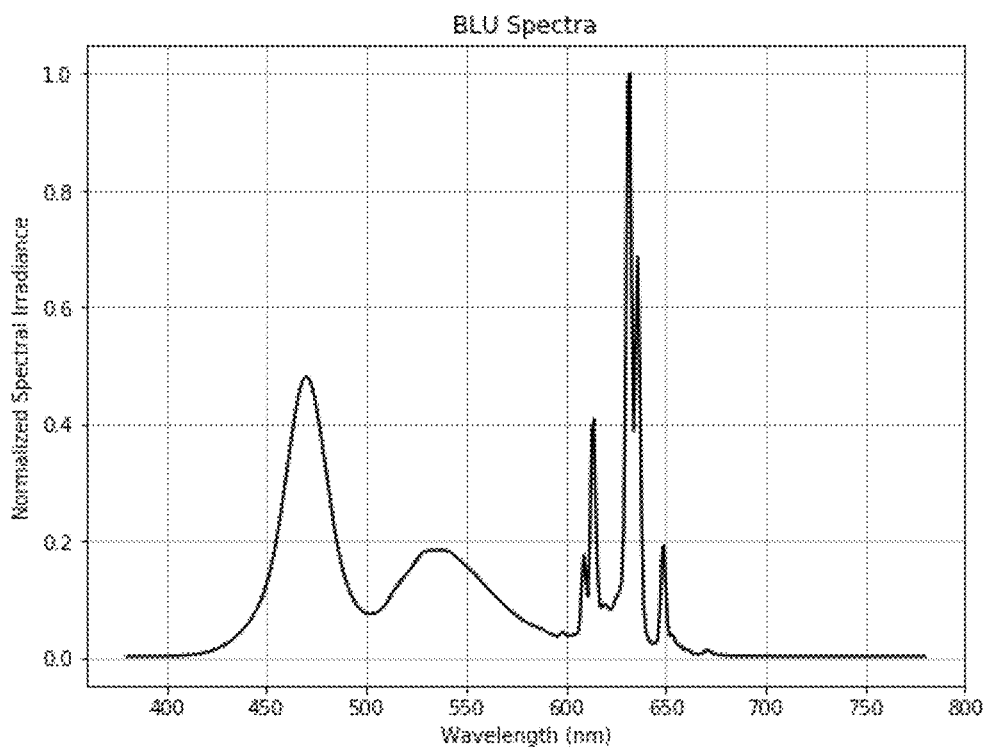
FIG. 1 shows a spectrum of one embodiment of a backlight in high circadian stimulation backlight mode.
Figure 2:
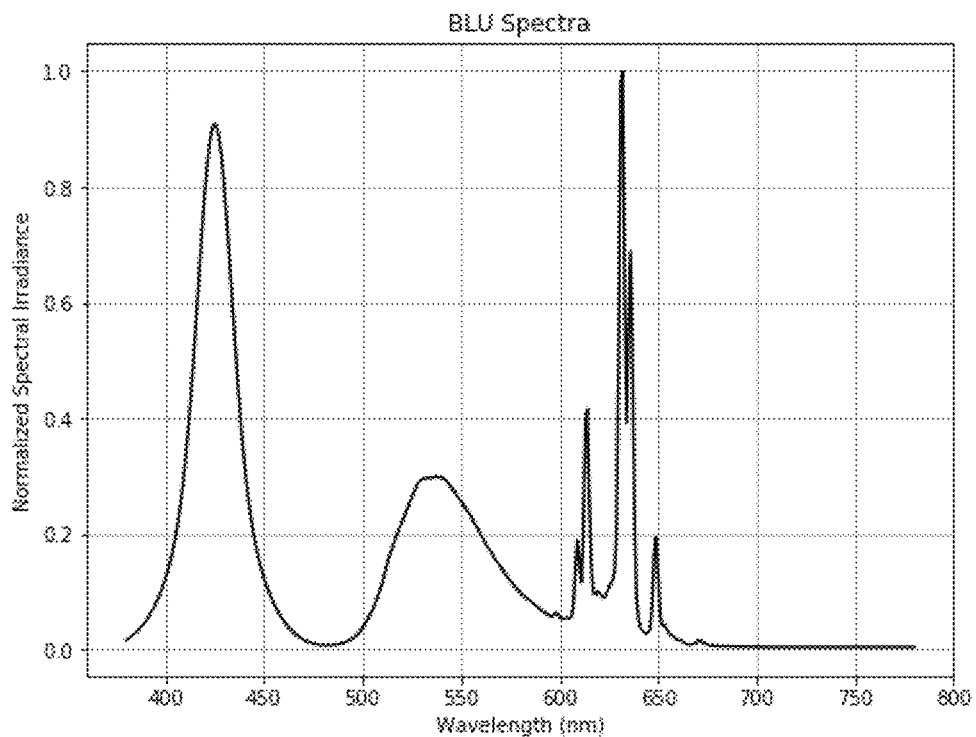
FIG. 2 shows a spectrum of one embodiment of a backlight in the low circadian stimulation backlight mode.

One aspect of the present invention is a backlight for a backlit display that controls or moderates circadian stimulation of the emitted light. For example, referring to FIG. 1, one embodiment of a high circadian stimulation spectrum is shown, and one embodiment of a low circadian stimulation spectrum is shown in FIG. 2. A comparison of the spectrums makes clear that the high circadian stimulation spectrum of FIG. 1 has a significant component of blue light in the 450-500 nm range while the low circadian stimulation spectrum of FIG. 2 does not. Rather, the low circadian stimulation spectrum of FIG. 2 has a relatively high violet component in the 380-430 nm Spectrum SPD One way to quantify the differences in the spectrums is with reference to the spectral power density (SPD) of the spectrum. Referring to Table 1, the SPD power in 50 nm increments for the high and low circadian stimulation spectrums of FIGS. 1 and 2, respectively, are provided. In one embodiment, the high circadian stimulation backlight emission spectrum has an SPD with an overall power, and a blue range from 440-490 nm with a blue SPD power of at least 25%, or at least 30%, or at least 35% of the overall power. In the spectrum of FIG. 1, the blue SPD power is 36.2%.

Conversely, in one embodiment, the low circadian stimulation backlight emission spectrum has an SPD with an overall power, and a blue range from 440-490 nm with a blue SPD power no greater than 15%, or no greater than 10%, or no greater than 8%, of the overall power of the low circadian stimulation backlight emission spectrum. In the embodiment of FIG. 2, the blue SPD power is 6.4% In one embodiment, the low circadian stimulation spectrum has instead a relatively high violet component. For example, in one embodiment, the violet SPD power from 380-430 nm is at least 20%, or at least 25%, or at least 30% of the overall power. In the embodiment of FIG. 2, the violet SPD power is 32.1%.

Conversely, in one embodiment, the high circadian stimulation backlight emission spectrum has a violet SPD power no greater than 10%, or no greater than 5%, or no greater than 1% of the overall power of the high circadian stimulation backlight emission spectrum. In the embodiment of FIG. 1, the violet SPD power is 0.9%

As mentioned above, another aspect of the present invention is to reduce potentially harmful light in the backlight emission—i.e., short blue light (445-460 nm.) In one embodiment, both the high and low circadian stimulation spectrums are configured to reduce the short blue light component. In one embodiment, the short blue SPD power is no greater than 15%, or no greater than 10%, or no greater than 8% of the overall power of the high circadian stimulation spectrum. In one embodiment, the short blue SPD power is no greater than 10%, or no greater than 8%, or no greater than 5% the overall power of the low circadian stimulation spectrum. In one embodiment, the short blue SPD power is no greater than 10%, or no greater than 8%, or no greater than 5% the overall power of the combined emissions of the low and high circadian stimulation spectrums.

Spectrum Melanopic Ratios

As is known, the high blue content of the high circadian stimulation spectrum tends to suppress a person's melatonin production such that it could be used during the day to promote healthy circadian cycles and not interfere with healthy sleep pattern. Conversely, the low blue content of the low circadian stimulation spectrum tends not to suppress a person's melatonin production such that it could be used during the evening to avoid disrupting healthy sleep pattern.

One way to quantify the circadian effect of a spectrum is to calculate its melanopic ratio as mentioned above. In one embodiment, the high circadian stimulation spectrum has a melanopic ratio of at least 1, or at least 1.1, or at least 1.2. In one embodiment, the low circadian stimulation spectrum has a melanopic ratio of less than 1, or no greater than 0.9, or no greater than 0.8.

Spectrum Shape

Yet another way of describing a spectrum is with respect to its peaks and valleys for certain colors. More specifically, Applicant has found that a spectrum can be adequately defined by the wavelengths of the peak and valley of blue, the peak of green, the valley of Orange, and the peak of red. For example, referring to Table 2 the aforementioned peak/valleys for the high and low circadian stimulation spectrums of FIGS. 1 and 2 are provided. In one embodiment, the high and low circadian stimulation spectrums of the present invention have peaks/valleys within 10% of the stated wavelengths, or, in another embodiment, within 5% of the stated wavelengths, or, in another embodiment within 1% of the stated wavelengths.

Other Parameters

Referring to Table 3, other light parameters that define the quality of light of the high and low circadian stimulation spectrums shown in FIGS. 1 and 2 are provided. In one embodiment, the high and low circadian stimulation spectrums of the present invention have light parameters within 0.01, or 0.005, or 0.001 duv of the x and y of Table 3.

Structure

The backlights of the present invention can be configured in different ways. In one embodiment, the backlight includes two types of LEDs: one violet (e.g., producing light in the 400 to 435 nm range) and one long-blue (e.g. producing light in the 470 to 490 nm range). In one embodiment, either or both LEDs are arranged to pump a phosphor to down convert some of the pump energy to produce other wavelengths and/or a broader bandwidth of light over a certain range. In one embodiment, both the violet and long-blue LEDs pump respective phosphors. For example, in one embodiment, the phosphors are a type of KSF phosphor (e.g., with dominant converted peak around 632 nm (Shin-Etsu D1027 and D2002 are examples) for the red emission and a type of Beta Sialon phosphor (e.g. with dominant converted peak around 540 nm (Mitsubishi BG601/G is an example) for the green emission.

For example, FIG. 1 shows the backlight spectrum when only the long-blue LEDs are on and pumping phosphor. In this embodiment, the long-blue LED has a pump wavelength of about 470 nm. As can be seen, the spectrum has a relatively high amount of energy between 450 and 500 nm. FIG. 2 shows the backlight spectrum when only the violet LEDs are on and pumping phosphor. In this embodiment, the violet LED has a pump wavelength of about 425 nm. As can be seen, the spectrum has a relatively low amount of energy between 450 and 500 nm.

The two types of LEDs may be used separately, at the same time or alternately. For example, in one embodiment, a backlit LCD computer display may include both long-blue LEDs pumping a phosphor and violet LEDs pumping a phosphor where both sets may be turned on at the same time, with different or similar power and/or apparent spectral emission intensities, or each set may be selectively chosen to be powered. For example, the long-blue set may be turned on during daytime hours to keep a user alert with melatonin suppression to maintain healthy circadian rhythms. The long-blue set may be turned off and the violet set may be turned on in the evening or nighttime hours to encourage melatonin production to encourage a transition to bedtime to maintain healthy circadian rhythms. In one embodiment, both the long-blue and the violet sets may be turned on together, for example, to increase the color gamut of the computer display or to transition between the two sets.

For example, in one embodiment of the use of the backlit display of the present invention, a user initially uses the display in the high circadian stimulation mode (i.e. first mode) in the morning, soon after waking up to stimulate his or her circadian rhythms. Once the circadian response is achieved, continued exposure to the high circadian stimulation has little effect. Therefore, in one embodiment, after waking up with the high circadian stimulation display, the display then shifts to the third mode which combines the high circadian and low circadian spectrums to show the content using an excellent gamut. In one embodiment, in the evening, the display shifts to the second mode to emit light having a low circadian stimulation to avoid suppressing melatonin and disrupting sleep.

Filters

Applicant has discovered unexpectedly that, when using a high and low circadian stimulation backlights, a conventional, sub-pixel filters used in LCD backlit displays has significant overlapping transmissions between filters that diminishes the gamut. Specifically, when using a high circadian stimulation backlight, there is significant overlapping transmission between the blue and green filters. This overlap results in excessive long blue or cyan being transmitted through the green filter. Additionally, because a conventional blue filter is centered around 450 nm, it cuts off about 20-40% of long blue and about 15% or so of violet. The emission of long blue/cyan in the conventional green filter and the suppression of long blue in the conventional blue filter reduces the quality of the gamut when using a high circadian stimulation backlight. Applicant also discovered that the conventional red filter transmits an undesirable amount of violet when using a low circadian stimulation backlight, again reducing gamut quality. Therefore, although, in one embodiment, the display of the present invention may include a backlight as described herein along with standard sub-pixel filters as a retrofit solution, in such embodiments, the display light may have a smaller gamut because the sub-pixels filters are not properly matched with the backlight spectrum. Alternatively, Applicant discloses herein a modified filter configuration aligned with the high and low circadian stimulation backlights to emit display light with optimum gamut.

Figure 8:
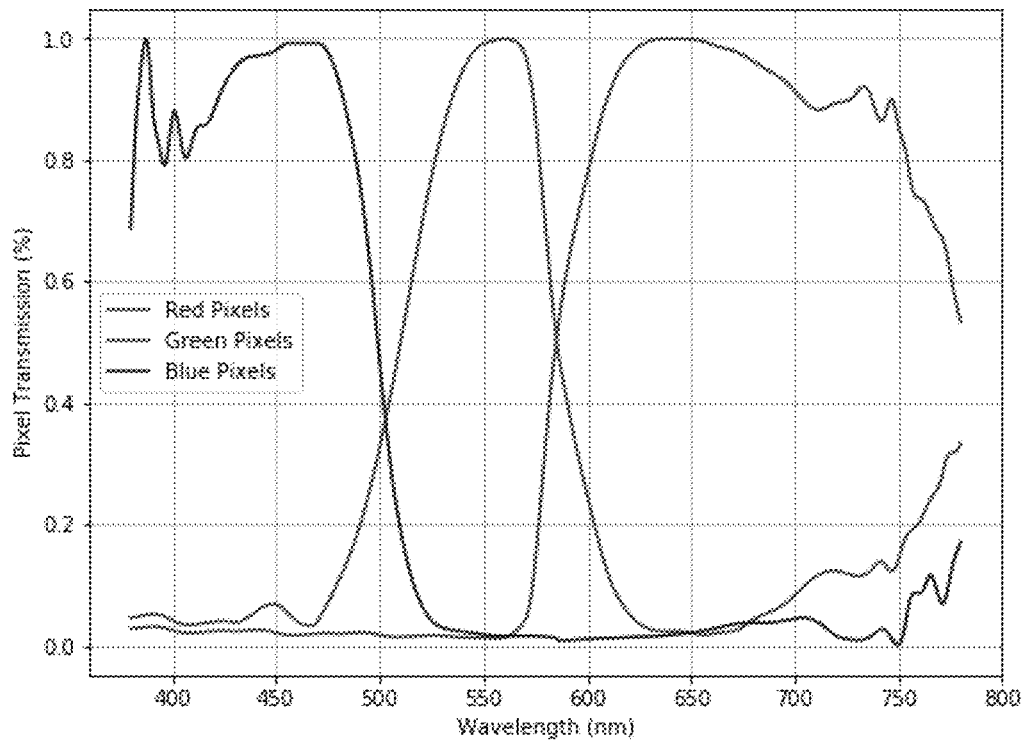
FIG. 8 shows the transmission values for one embodiment of the blue, green, and, red filters of the present invention.

Referring to FIG. 8, the transmission values for one embodiment of the blue, green, and, red filters of the present invention is shown. The blue sub-pixel filter passes wavelengths in a blue region, the green passes green wavelengths and the red passes red wavelengths. Throughout this description, the filters are described for simplicity as blue, green, and red filters. It should be understood, however, that these color identifiers are intended to broadly define the filters, and that the filters are not restricted to traditionally blue, green, and red colors. Indeed, the blue, green, and red filters are also referred to herein as the first, second, and third filters respectively. Additionally, it should be understood that, in some embodiments, additional or fewer filters may be used with the blue, green and red filters. For example, in one embodiment, a long and a short blue filter may be used instead of a single blue filter.

Figure 3:
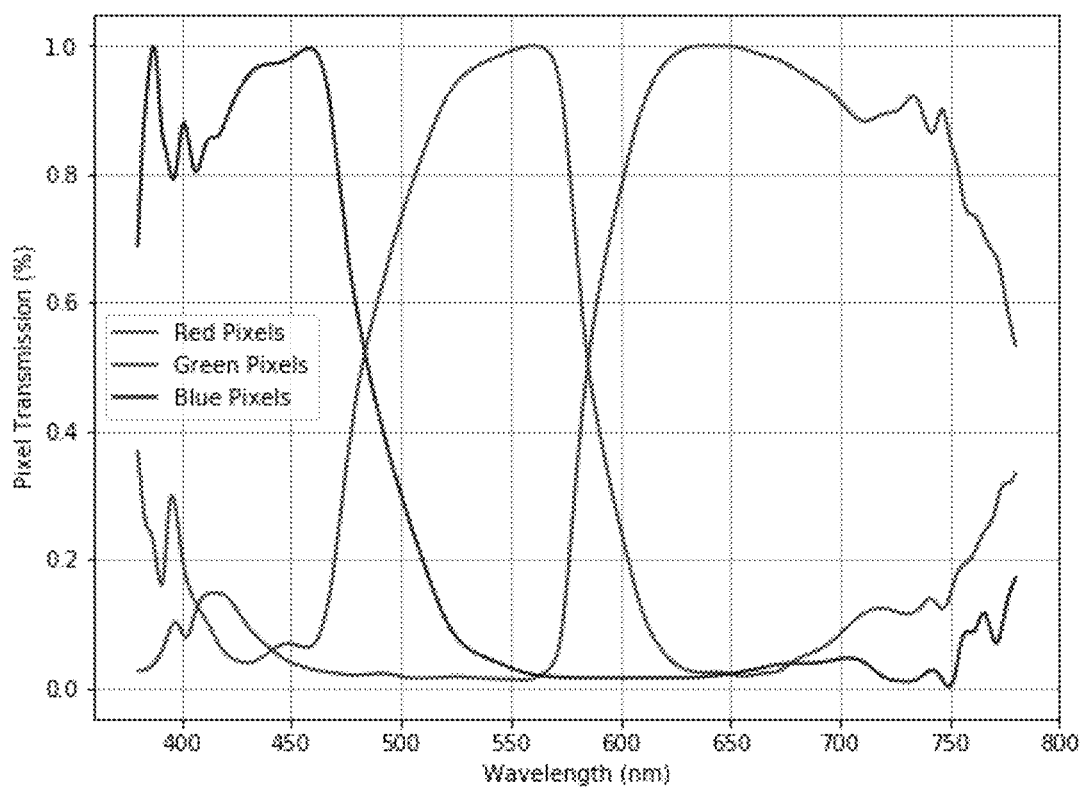
FIG. 3 shows the transmission values for conventional blue, green, and, red filters.

As is known, filters tend to have overlap where two different filters pass similar wavelengths. The overlap is minimized in one embodiment of the present invention to avoid blending between the sub-colors, which can impact color gamut. For comparison, FIG. 3 shows the transmission curves for conventional red, green, and blue sub-pixel filters. Comparing the two filter configurations, one can see that there is more overlap of the blue and green transmission curves in the regions between about 465 nm and 510 nm in FIG. 3. Indeed, the conventional green filter has significantly more transmission in the 460 nm to 500 nm range than the embodiment described in FIG. 8. This increased green filter transmission allows much more of the long-blue light to transmit when the computer display is calling for green. This causes a decreased ability to produce a more saturated green pixel and hence the display produces a smaller gamut.

Figure 4:
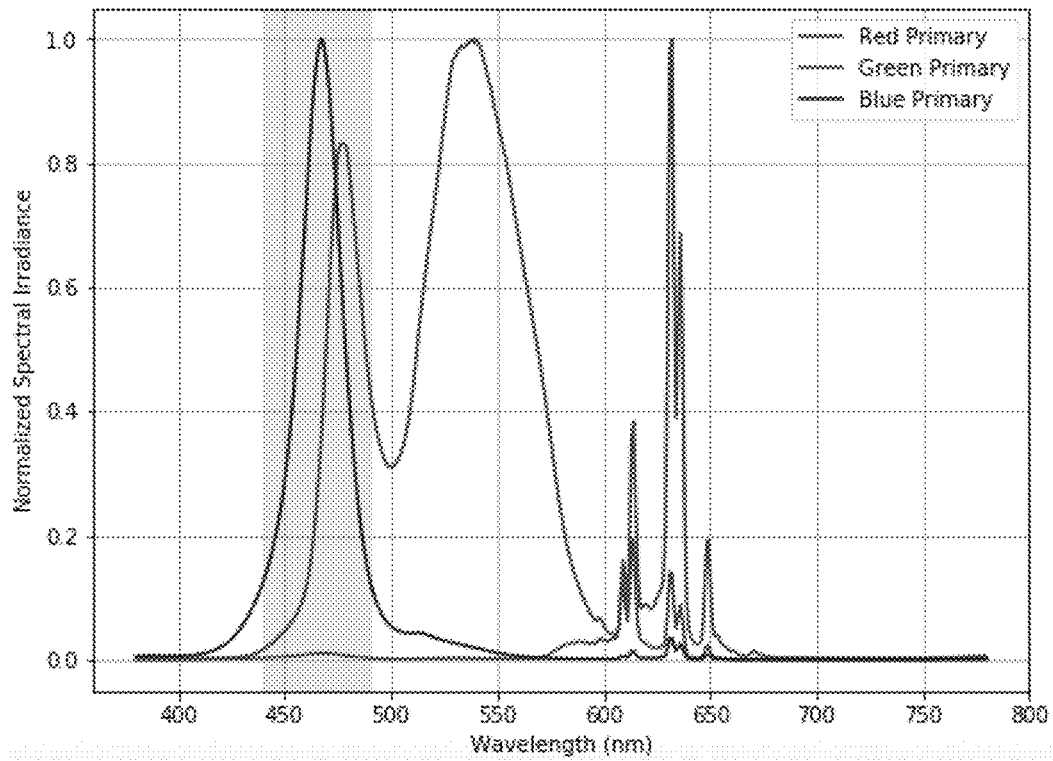
FIG. 4 shows the normalized spectral irradiance of the individual display pixels resulting from using the conventional filters shown in FIG. 3 in combination with the backlight of the embodiment of FIG. 1.
Figure 5:
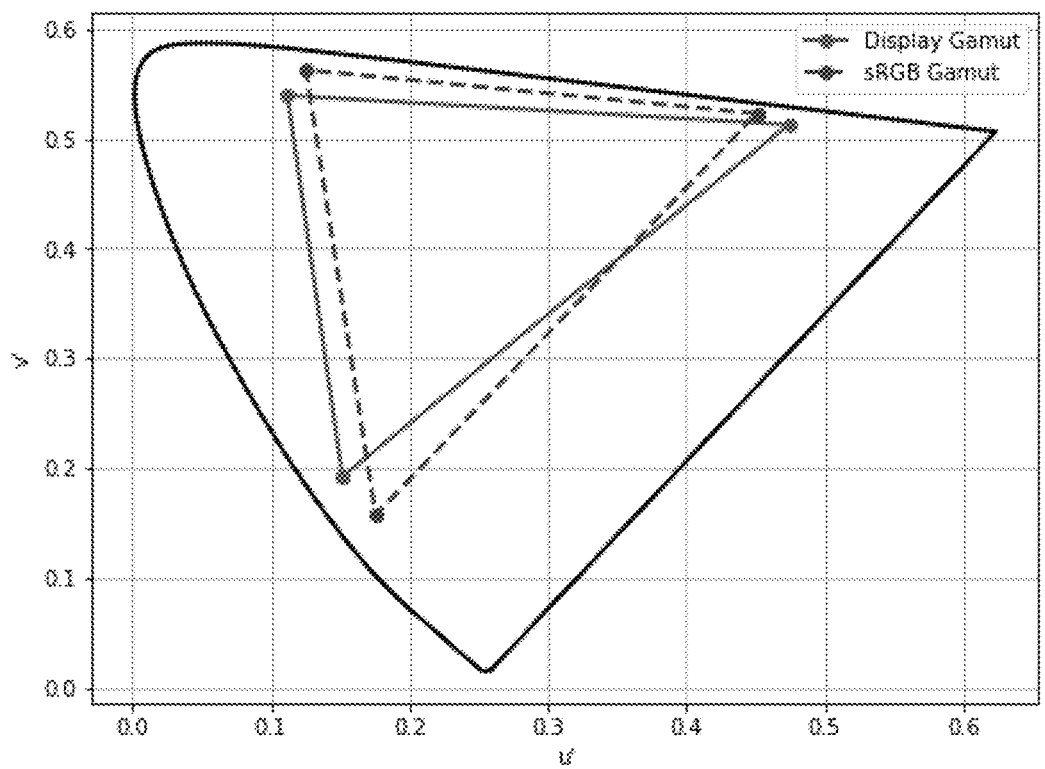
FIG. 5 shows the display gamut versus the sRGB gamut resulting from using the conventional filters of FIG. 3 in combination with the backlight of the embodiment of FIG. 1.

For example, when the backlight spectrum described in connection with FIG. 1 is used to backlight a display with the individual display pixels resulting from using the conventional filters described in connection with FIG. 3 the resulting spectrum includes much more blue light through the green filter, as shown in FIG. 4. The resulting gamut is shown in FIG. 5. As can be seen in FIG. 5, the extra blue light transmission from the green filter results in less coverage in the green region of the standard color gamut sRGB. Certain metrics of the embodiment represented by FIG. 5 are as follows:

Melanopic Ratio: 1.27
Blue Percentage (radiometric power between 440 nm and 490 nm): 32.3%
sRGB Coverage: 83.6%
DCIP3 Coverage: 73.7%
Rec2020 Coverage: 55.6%

Figure 6:
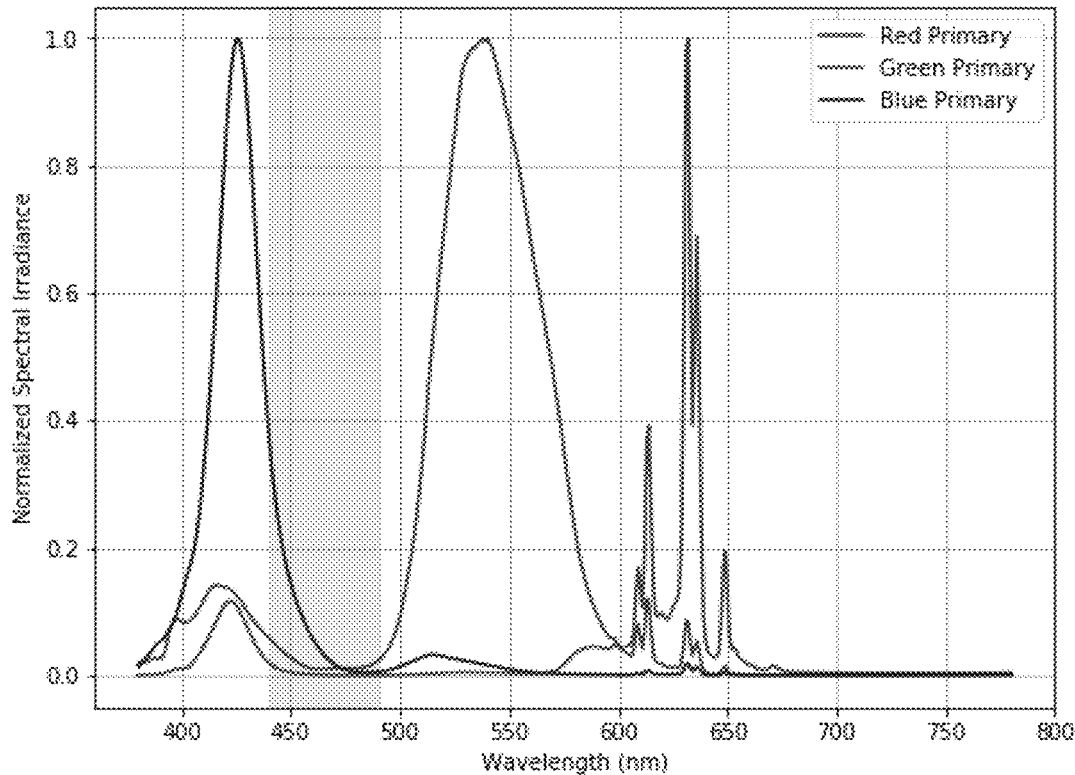
FIG. 6 shows the normalized spectral irradiance of the individual display pixels resulting from using the conventional filters shown in FIG. 3 in combination with the backlight of the embodiment of FIG. 2.
Figure 7:
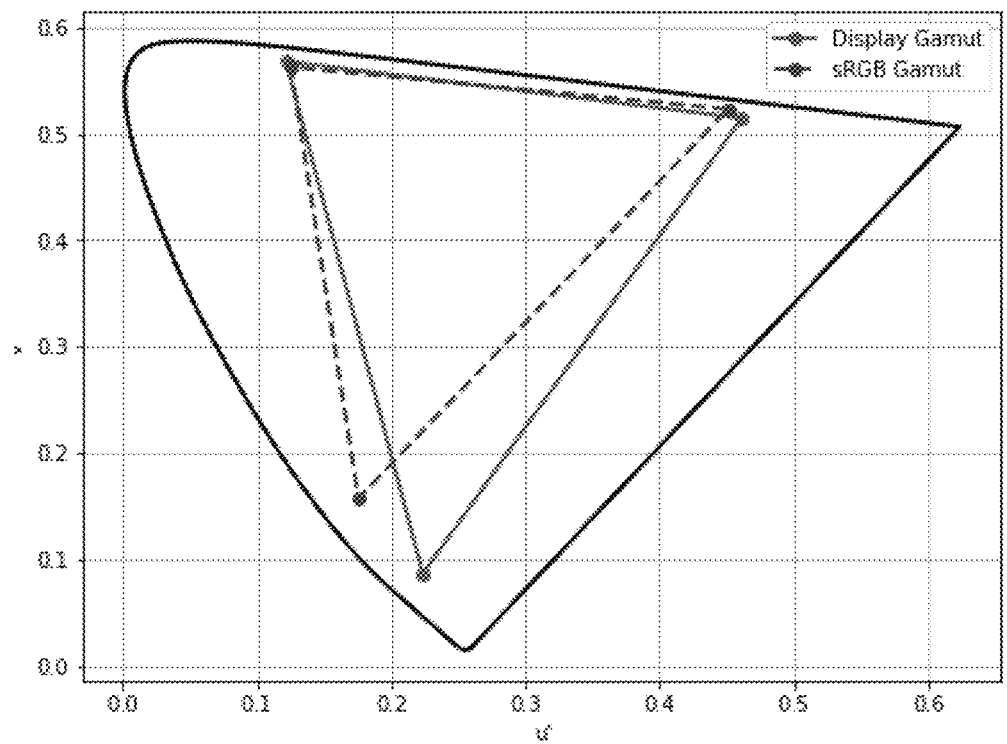
FIG. 7 shows the display gamut versus the sRGB gamut resulting from using of the filters of FIG. 3 in combination with the backlight of the embodiment of FIG. 2.

Likewise, using conventional filters on the low circadian stimulation backlight of FIG. 2 results in a smaller gamut. For example, FIG. 6 shows the spectrum of an LCD display in which the violet pumped backlight spectrum shown in FIG. 2 is used with the conventional filters of FIG. 3. The resulting color gamut for the spectrum of FIG. 6 is shown in FIG. 7. Certain metrics of the embodiment represented by FIG. 7 are as follows:

Melanopic Ratio: 0.72
Blue Percentage (radiometric power between 440 nm and 490 nm): 5.5%
sRGB Coverage: 83.0%
DCIP3 Coverage: 73.8%

Rec2020 Coverage: 59.0%

The filter configuration shown in FIG. 8 broadens the gamut compared to the conventional filter configuration of FIG. 3, by, in one embodiment, increasing the lower transmission wavelength of the green filter to minimize overlap with the blue in the 460 nm to 500 nm range. Additionally, in one embodiment, the upper transmission wavelength of the blue filter is increased to include long blue/cyan. In one embodiment, the violet transmission in the red filter is essentially eliminated. In one embodiment, two or more of these changes are incorporated into a RGB filter configuration. In one embodiment, each of these changes is incorporated into a RGB filter configuration, as shown in FIG. 8. The characteristics of various embodiments of the filter of the present invention are described below.

One way of describing the transmission profile of a configuration of filters is to define their crossover points—i.e., the wavelength at which two adjacent filters have the same transmissivity. In one embodiment, the blue and green filters have transmissivities that cross over at about 490 nm to about 520 nm, or, in one embodiment, at about 495 to about 505 nm, or at about 500 nm. In one embodiment, the green and red filters have transmissivities that crossover at 570 nm to about 600 nm, or, in one embodiment, at about 575 nm to about 585 nm, or, in one embodiment, at about 580 nm. In comparison, the blue and green filters of a conventional filter configuration have a crossover at about 475-480 nm.

Another way of describing the transmission profile of filters is the range of wavelength at which their transmissivity is at or above a given transmissivity value (herein the "transmission range"). The transmissivity value used herein is 10%. In one embodiment, the blue filter has a transmission range between 360 nm and 580 nm. In one embodiment, the upper limit of the transmission range is no greater than about 580 nm, or, in one embodiment, no greater than about 575 nm, or, in one embodiment, no greater than about 570 nm. In comparison, a conventional blue filter has multiple transmission ranges—i.e., one below 570 nm and a second above 760 nm.

In one embodiment, the green filter has a transmission range between 460 nm and 675 nm. In one embodiment, the lower limit of the transmission range is no less than about 460 nm, or, in one embodiment, no less than about 475 nm, or, in one embodiment, no less than about 480 nm. In one embodiment, the upper limit of the transmission range is no greater than about 675 nm, or, in one embodiment, no greater than about 670 nm, or, in one embodiment, no greater than about 660 nm. In comparison, a conventional green filter has multiple transmission ranges—i.e., one below 415 nm, a second from 465 nm to 665 nm, and a third above 695 nm.

In one embodiment, the red filter has a transmission range between 560 nm and 800+ nm. In one embodiment, the lower limit of the transmission range is no less than about 560 nm, or, in one embodiment, no less than about 565 nm, or, in one embodiment, no less than about 575 nm. In comparison, a conventional red filter has multiple transmission ranges—i.e., one below 480 nm, and a second above 675 nm.

Referring to FIGS. 9-13, the quality light emitted from embodiments of displays is considered using the high and low circadian stimulation backlight spectrums of FIGS. 1 and 2, respectively, and the filter configuration of FIG. 8.

Figure 9:
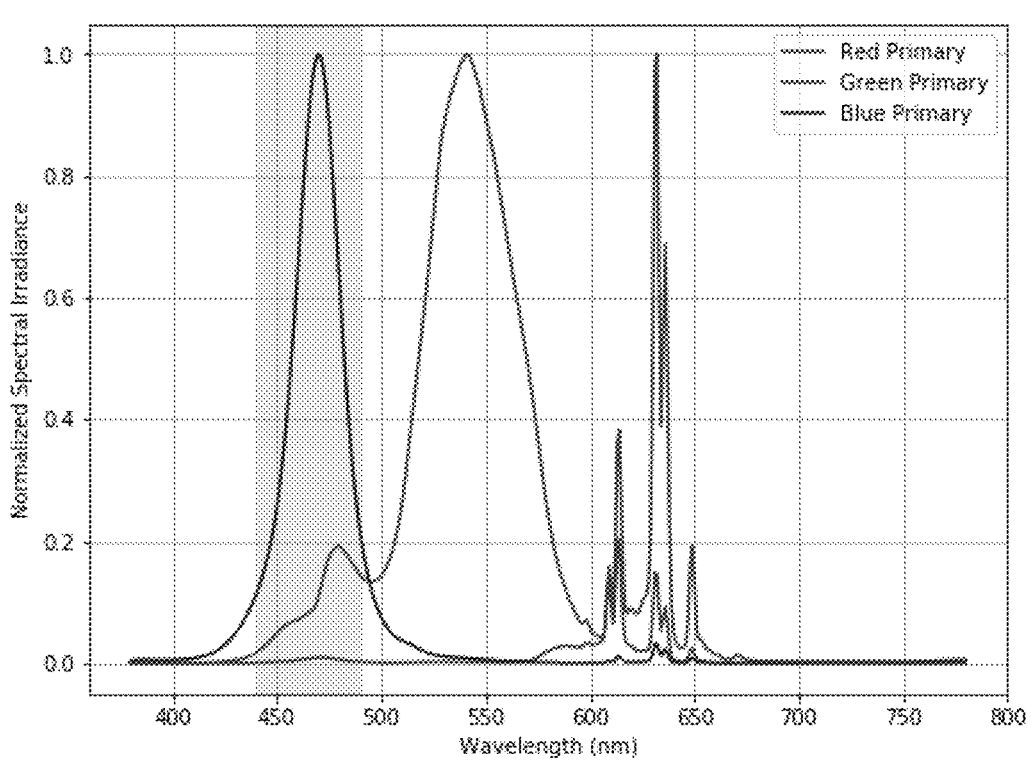
FIG. 9 shows the normalized spectral irradiance of the individual display pixels resulting from using the filters of the embodiment of FIG. 8 in combination with the backlight of the embodiment of FIG. 1.

FIG. 9 shows the normalized spectral irradiance of the filters of the embodiment of FIG. 8 in combination with the backlight of the embodiment of FIG. 1. The shaded rectangular area between about 440 nm and 490 nm represents a wavelength range that may affect a person's circadian rhythms (circadian range). The circadian range can be used in a calculation of a blue light SPD power as a percentage of overall SPD power. The blue light percentage may be calculated as an amount of light emitted within the circadian range as a percentage of the total light emitted by the display when all sub-pixels are on. The blue percentage of the configuration represented in FIG. 9 is 32.9%, which is a desirable level for a high circadian stimulation application. A conventional prior art display has been measured to have approximately 24% blue percentage.

Figure 10:
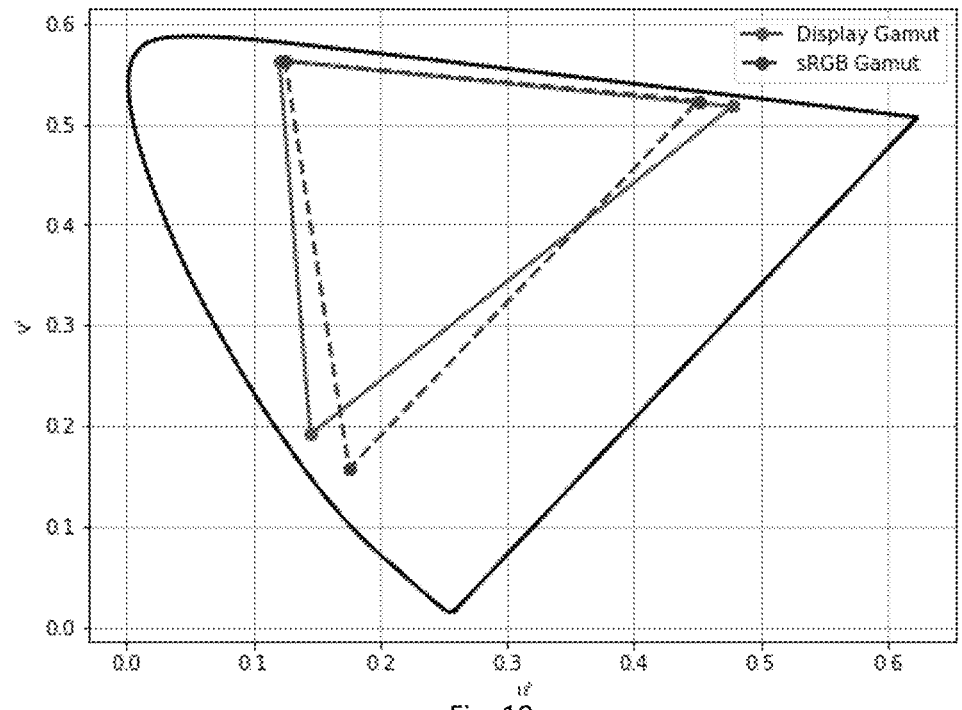
FIG. 10 shows the display gamut versus the sRGB gamut resulting from using the filters of the embodiment of FIG. 8 in combination with the backlight of the embodiment of FIG. 1.

FIG. 10 shows the display gamut in solid blue lines versus the sRGB gamut in dashed lines resulting from using the filters of the embodiment of FIG. 8 in combination with the backlight of the embodiment of FIG. 1. As can be seen, the new display color gamut substantially covers the standard gamut. Certain metrics of the embodiment represented by FIG. 10 are as follows:
  Melanopic Ratio: 1.24
  Blue Percentage (percentage of radiometric power between 440 nm and 490 nm): 32.9%
  sRGB Coverage: 90.0%
  DCIP3 Coverage: 77.8%
  Rec2020 Coverage: 58.7%

The filter embodiment shown in FIG. 8 also is effective in improving the gamut of the low circadian stimulation backlight shown in FIG. 2. For example, the three separate filter transmissivity curves for red, green, and blue sub-pixels as shown in FIG. 8 are matched with a backlight having the spectrum of FIG. 2. The resulting filtered spectrum for the three sub-pixels is shown in FIG. 11.

Figure 11:
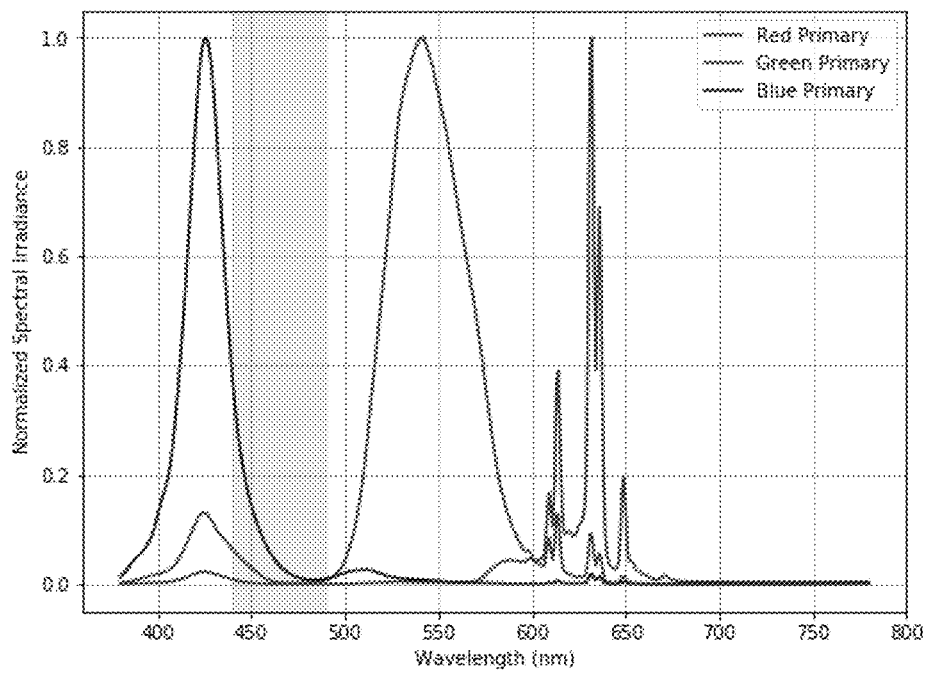
FIG. 11 shows the normalized spectral irradiance of the individual display pixels resulting from using the filters of the embodiment of FIG. 8 in combination with the backlight of the embodiment of FIG. 2.
Figure 12:
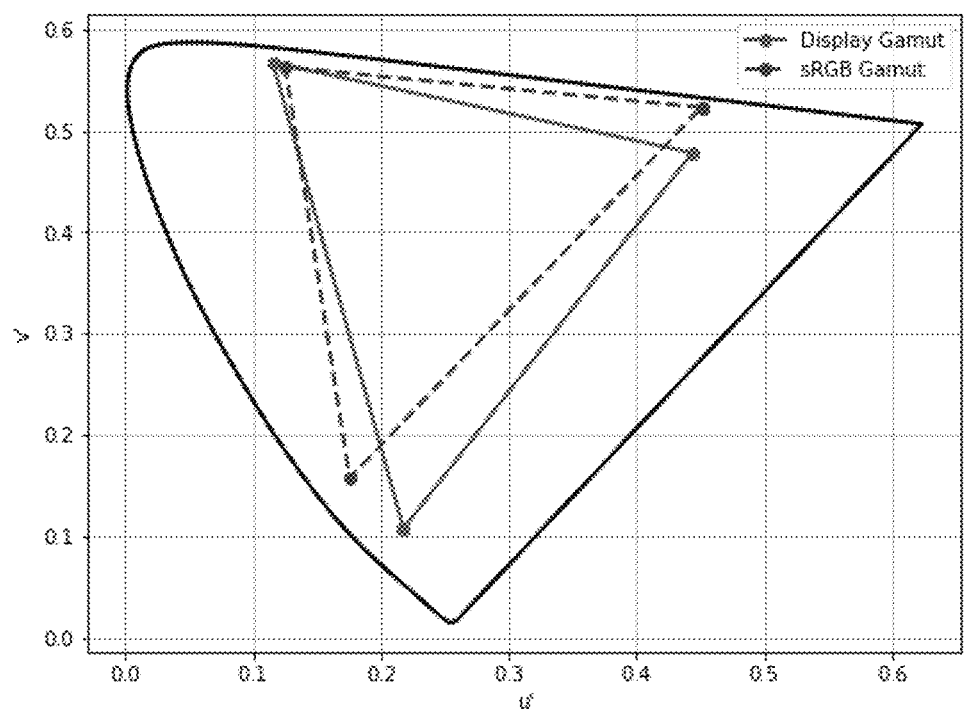
FIG. 12 shows the display gamut versus the sRGB gamut resulting from using the filters of the embodiment of FIG. 8 in combination with the backlight of the embodiment of FIG. 2.

FIG. 11 shows the normalized spectral irradiance of the filters of the embodiment of FIG. 8 in combination with the backlight of the embodiment of FIG. 2, and FIG. 12 shows the display gamut in solid line versus the sRGB gamut in dashed line resulting from using the filters of the embodiment of FIG. 8 in combination with the backlight of the embodiment of FIG. 2. Certain metrics of this embodiment are as follows:
  Melanopic Ratio: 0.69
  Blue Percentage (radiometric power between 440 nm and 490 nm): 6.0%
  sRGB Coverage: 90.3%
  DCIP3 Coverage: 80.3%
  Rec2020 Coverage: 64.0%

Figure 13:
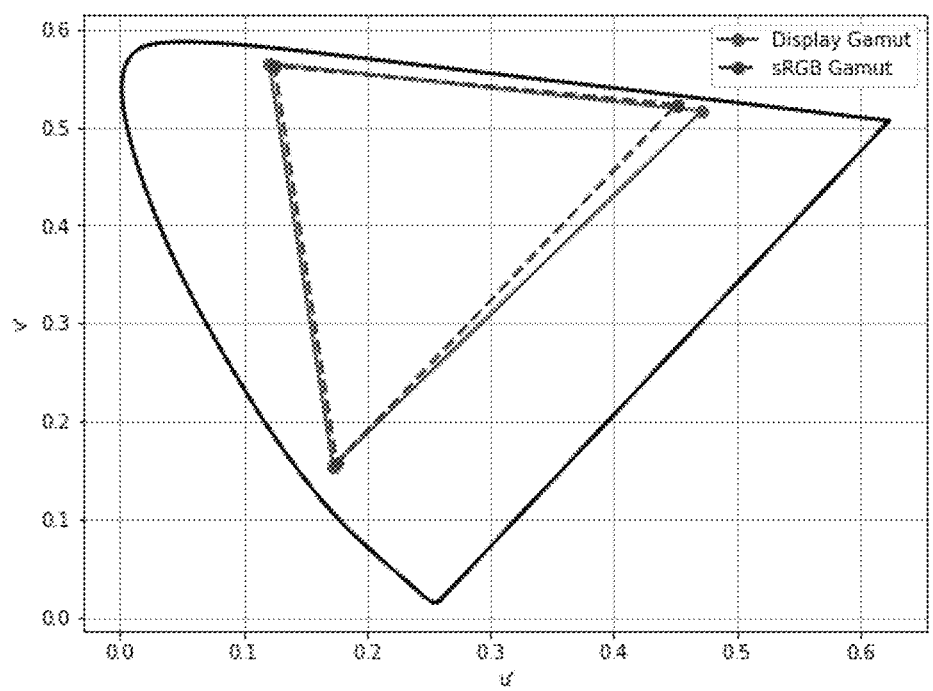
FIG. 13 shows the display gamut versus the sRGB gamut resulting from using the filters of FIG. 8 with the combined backlight emissions of the embodiment of FIG. 1 and the embodiment of FIG. 2.

FIG. 13 shows the display gamut versus the sRGB gamut resulting from using the filters of FIG. 8 with the combined backlight emissions of the embodiment of FIG. 1 and the embodiment of FIG. 2. Certain metrics of the embodiment represented by FIG. 13 are as follows:
  Melanopic Ratio: 0.86
  Blue Percentage (radiometric power between 440 nm and 490 nm): 14.9%
  sRGB Coverage: 99.4%
  DCIP3 Coverage: 86.5%
  Rec2020 Coverage: 63.1%

While this disclosure has focused discussion on particular LEDs, phosphors, backlights, and other components of a computer display, it should be understood that these are only examples of improved computer displays in accordance with the principles of the present inventions. Various alterations, modifications, and improvements will readily occur to those skilled in the art in light of this disclosure. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

TABLE 1

|  | 320-350 | 351-400 | 401-450 | 451-500 | 501-550 | 551-600 | 601-650 | 651-700 | 701-750 | 751-800 |
|---|---|---|---|---|---|---|---|---|---|---|
| FIG. 1 | 0% | 1% | 22% | 186% | 100% | 56% | 138% | 7% | 2% | 1% |
| FIG. 8 | 0% | 11% | 217% | 14% | 100% | 60% | 95% | 6% | 2% | 1% |

TABLE 2

| | | | | Peaks and valleys | | | | | | | | |
|---|---|---|---|---|---|---|---|---|---|---|---|---|
| | | | | Bp | | Bv | | Gp | | Ov | | Rp | |
| | x | y | λ(dom) | Bp | wavelength | Bv | wavelength | Gp | wavelength | Ov | wavelength | Rp | wavelength |
| FIG. 1 | 0.298332 | 0.299949 | 479 | 0.481767 | 471 | 0.075757 | 503 | 0.185028 | 539 | 0.0372296 | 597 | 1 | 633 |
| FIG. 2 | 0.298051 | 0.288676 | 472 | 0.908793 | 426 | 0.007346 | 483 | 0.299062 | 539 | 0.0527706 | 603 | 1 | 633 |

TABLE 3

| | | | Quality of Light Parameters | | | | |
|---|---|---|---|---|---|---|---|
| | | | Normalize to 470-510 band | | | | |
| | 350-400/ 470-510 | 400-470/ 470-510 | 470-510/ 470-510 | 510-570/ 470-510 | 570-600/ 470-510 | 600-700/ 470-510 | 700-800/ 470-510 |
| FIG. 1 | 0.007983 | 0.961533 | 1 | 1.074746 | 0.210252 | 1.2702778 | 0.032804 |
| FIG. 2 | 1.005184 | 21.08261 | 1 | 12.04326 | 2.327329 | 9.3356657 | 0.291736 |

What is claimed is:

1. A backlit display for emitting a display light, said display comprising:
   a backlight configured to emit a high circadian stimulation backlight spectrum having a melanopic ratio of at least 1;
   a pixel array comprising at least three filters, said at least three filter comprising at least a first filter, a second filter, and third filter, forming at least three sub-pixels, wherein said backlight is configured to backlight said pixel array, and
   wherein said display light has a gamut having an sRGB coverage of at least 85%.

2. The backlit display of claim 1, wherein said high circadian stimulation backlight spectrum has a spectral power distribution (SPD) with an overall power, and a blue range from 440-490 nm with a blue SPD power of at least 25% of said overall power.

3. The backlit display of claim 1, wherein said sRGB coverage is at least 88%.

4. The backlit display of claim 1, wherein said melanopic ratio is at least 1.1.

5. The backlit display of claim 1, wherein said high circadian stimulation backlight spectrum has a violet range from 380-430 nm with a violet SPD power of no greater than 5% of said overall power.

6. The backlit display of claim 1, wherein said high circadian stimulation backlight spectrum has a short blue range from 445-460 nm having a short blue SPD power no greater than 15% of said overall power.

7. A backlit display for emitting a display light, said display comprising:
   a backlight configured to emit a low circadian stimulation backlight spectrum having a melanopic ratio of less than 1;
   a pixel array comprising at least three filters, said at least three filter comprising at least a first filter, a second filter, and third filter, forming at least three sub-pixels, wherein said backlight is configured to backlight said pixel array, and
   wherein said display light has a gamut having an sRGB coverage of at least 85%.

8. The backlit display of claim 7, wherein a spectral power distribution (SPD) with an overall power, and a violet range from 380-430 nm with a violet SPD power of at least 20% of said overall power.

9. The backlit display of claim 7, wherein said sRGB coverage is at least 88%.

10. The backlit display of claim 7, wherein, said melanopic ratio of no greater than 0.9.

11. The backlit display of claim 7, wherein said low circadian stimulation backlight spectrum has a blue range from 440-490 nm with a blue SPD power of no greater than 10% of said overall power.

12. The backlit display of claim 7, wherein said low circadian stimulation backlight spectrum has a short blue range from 445-460 nm having a short blue SPD power no greater than 10% of said overall power.

13. A backlight for a backlit display for emitting variable display light, said backlight comprising:
a plurality of LED channels configured to emit circadian stimulation backlight in a plurality of modes,
a first mode in which a high circadian stimulation backlight spectrum having a first CCT is emitted,
a second mode in which a low circadian stimulation backlight spectrum having a second CCT is emitted, and
a third mode in which a combined backlight spectrum of said low circadian stimulation backlight spectrum and said high circadian stimulation backlight spectrum is emitted,
circuitry for driving said plurality of channels independently; and
wherein said first CCT is within +/−20% of said second CCT.

14. The backlight of claim 13, wherein said third mode varies over a continuum between said low circadian stimulation backlight spectrum to said high circadian stimulation backlight spectrum.

15. The backlit display of claim 13, wherein the CCT of said combined backlight emission in said third mode does not vary by more than 20%.

16. The backlight of claim 13, wherein said high circadian stimulation backlight spectrum has a melanopic ratio of at least 1, and said low circadian stimulation backlight spectrum has a melanopic ratio of less than 1.

17. The backlight of claim 13, wherein said high circadian stimulation backlight spectrum has a first SPD with a first overall power, and having a blue range from 440-490 nm with a blue SPD power of at least 25% of said first overall power, said low circadian stimulation backlight spectrum has a second SPD with a second overall power, and a violet range of 380-430 nm with a violet SPD power of at least 20% of said second overall power.

18. The backlight of claim 13, further comprising:
a pixel array comprising at least three filters, said at least three filter comprising at least a first filter, a second filter, and third filter, forming at least three sub-pixels, wherein said backlight is configured to backlight said pixel array, and
wherein said display light has a gamut having an sRGB coverage of at least 85% in either said first mode or said second mode.

19. The backlight of claim 18, wherein said display light has a gamut having an sRGB coverage of at least 85% in said third mode.

* * * * *